(12) United States Patent
Kususe et al.

(10) Patent No.: US 9,132,886 B2
(45) Date of Patent: Sep. 15, 2015

(54) SHIFT OPERATING DEVICE

(75) Inventors: Takashi Kususe, Osaka (JP); Yoshimitsu Miki, Osaka (JP); Shinji Kawamura, Osaka (JP); Tatsuya Matsushita, Osaka (JP); Takefumi Terada, Osaka (JP)

(73) Assignee: Shimano Inc., Osaka (JP)

( * ) Notice: Subject to any disclaimer, the term of this patent is extended or adjusted under 35 U.S.C. 154(b) by 679 days.

(21) Appl. No.: 12/574,826

(22) Filed: Oct. 7, 2009

(65) Prior Publication Data

US 2011/0079103 A1 Apr. 7, 2011

(51) Int. Cl.
| | |
|---|---|
| *F16C 1/10* | (2006.01) |
| *B62M 25/04* | (2006.01) |
| *B60T 7/10* | (2006.01) |
| *B62K 23/06* | (2006.01) |

(52) U.S. Cl.
CPC ............... *B62M 25/04* (2013.01); *B60T 7/102* (2013.01); *B62K 23/06* (2013.01); *Y10T 74/20438* (2015.01)

(58) Field of Classification Search
USPC .......................... 74/489, 500.5, 501.6, 502.2
See application file for complete search history.

(56) References Cited

U.S. PATENT DOCUMENTS

| | | | |
|---|---|---|---|
| 5,257,683 A | 11/1993 | Romano | |
| 5,400,675 A | 3/1995 | Nagano | |
| 5,791,195 A | 8/1998 | Campagnolo | |
| 5,832,782 A | 11/1998 | Kawakami | |
| 7,100,471 B2 * | 9/2006 | Irie et al. ...................... 74/502.2 |
| 7,665,384 B2 * | 2/2010 | Sato et al. .................... 74/502.2 |
| 7,779,718 B2 * | 8/2010 | Jordan et al. ................. 74/502.2 |
| 2002/0104401 A1 | 8/2002 | Dal Pra | |
| 2005/0109148 A1 * | 5/2005 | Tsumiyama ................. 74/502.2 |
| 2006/0272443 A1 * | 12/2006 | Tsumiyama ................. 74/502.2 |

(Continued)

FOREIGN PATENT DOCUMENTS

| | | | | |
|---|---|---|---|---|
| DE | 3136922 A1 * | 3/1983 | ............ B62K 23/06 |
| EP | 1 630 094 A1 | 3/2006 | | |

(Continued)

OTHER PUBLICATIONS

EP Search Report of corresponding EP Application No. 10 17 3682.5 dated Nov. 8, 2010.

(Continued)

*Primary Examiner* — Vicky Johnson
(74) *Attorney, Agent, or Firm* — Global IP Counselors

(57) ABSTRACT

A shift operating device is basically provided with a bracket member, a support structure, a wire takeup member, a positioning mechanism, and a control member. The bracket member is mounted to a bicycle. The support structure is removably mounted to the bracket member. The wire takeup member is movably supported by the support structure. The positioning mechanism includes first and second positioning members supported by the support structure. The first positioning member integrally moves with the wire takeup member. The second positioning member engages the first positioning member such that the first positioning member has a plurality of operating positions. The control member has a first portion movably supported by the support structure inside the bracket member and a second portion disposed outside the bracket member. The control member is operatively coupled to the positioning mechanism for changing the operating position of the first positioning member.

18 Claims, 9 Drawing Sheets

(56) References Cited

U.S. PATENT DOCUMENTS

2007/0068314 A1     3/2007   Miki
2007/0245847 A1*   10/2007   Chen .......................... 74/502.2
2008/0295638 A1    12/2008   Miki et al.
2008/0314191 A1    12/2008   Miki et al.
2010/0083788 A1*    4/2010   Jordan et al. ................ 74/502.2

FOREIGN PATENT DOCUMENTS

| | | |
|---|---|---|
| EP | 1 705 110 A1 | 9/2006 |
| EP | 1 997 724 A2 | 12/2008 |
| JP | 3283289 B2 | 3/2002 |
| TW | 472756 U | 1/2002 |
| TW | 200902375 A | 1/2009 |
| TW | 200902376 A | 1/2009 |

OTHER PUBLICATIONS

Taiwanese Office Action of corresponding TW Application No. 099103552 issued on Nov. 21, 2012.

\* cited by examiner

SHIFT OPERATING DEVICE

BACKGROUND OF THE INVENTION

1. Field of the Invention

This invention generally relates to a shift operating device for operating a bicycle component. More specifically, the present invention relates to a shift operating device that has a support structure that allows its shift control unit to be easily replaced.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the shift operating devices for performing shifting and braking operations.

Typically, bicycle shifters mechanically operate derailleurs via cables, while bicycle brake levers mechanically operate brake devices via cables. In either case, an operating force is typically applied by one of the rider's fingers to operate a control lever, which in turn transmitted the operating force to the drive component of a bicycle shifting mechanism by a cable that was fixed at one end to the control lever. Currently, many different types of control devices exist for performing shifting and braking operations.

Sometimes the bicycle shifter and the bicycle brake lever are combined as a single integrated unit, while other times they are separate individual units. In the case of road bikes with drop type handlebars, the bicycle shifter and the bicycle brake lever are often combined as a single integrated control device. In some cases, a braking function and a shifting function is performed by a single dual function lever, One example of this type of control device is disclosed in U.S. Pat. No. 5,400,675 to Nagano (assigned to Shimano, Inc). More typically, one or two shift levers are provided in addition to the brake lever. One example of this type of control device is disclosed in U.S. Pat. No. 5,257,683 to Romano (assigned to Campagnolo).

SUMMARY OF THE INVENTION

One object of the present invention is to provide a shift operating device with a support structure that allows the shift control unit to be easily replaced.

The foregoing objects can basically be attained by providing a shift operating device that basically comprises a bracket member, a support structure, a wire takeup member, a positioning mechanism, and a control member. The bracket member is configured to be mounted to a bicycle. The support structure is removably mounted to the bracket member. The wire takeup member is movably supported by the support structure. The positioning mechanism includes a first positioning member and a second positioning member. The first positioning member is movably supported by the support structure and configured to integrally move with the wire takeup member. The second positioning member is supported by the support structure and configured to engage the first positioning member such that the first positioning member has a plurality of operating positions. The control member has a first portion movably supported by the support structure inside the bracket member and a second portion disposed outside the bracket member. The control member is operatively coupled to the positioning mechanism for changing the operating position of the first positioning member.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
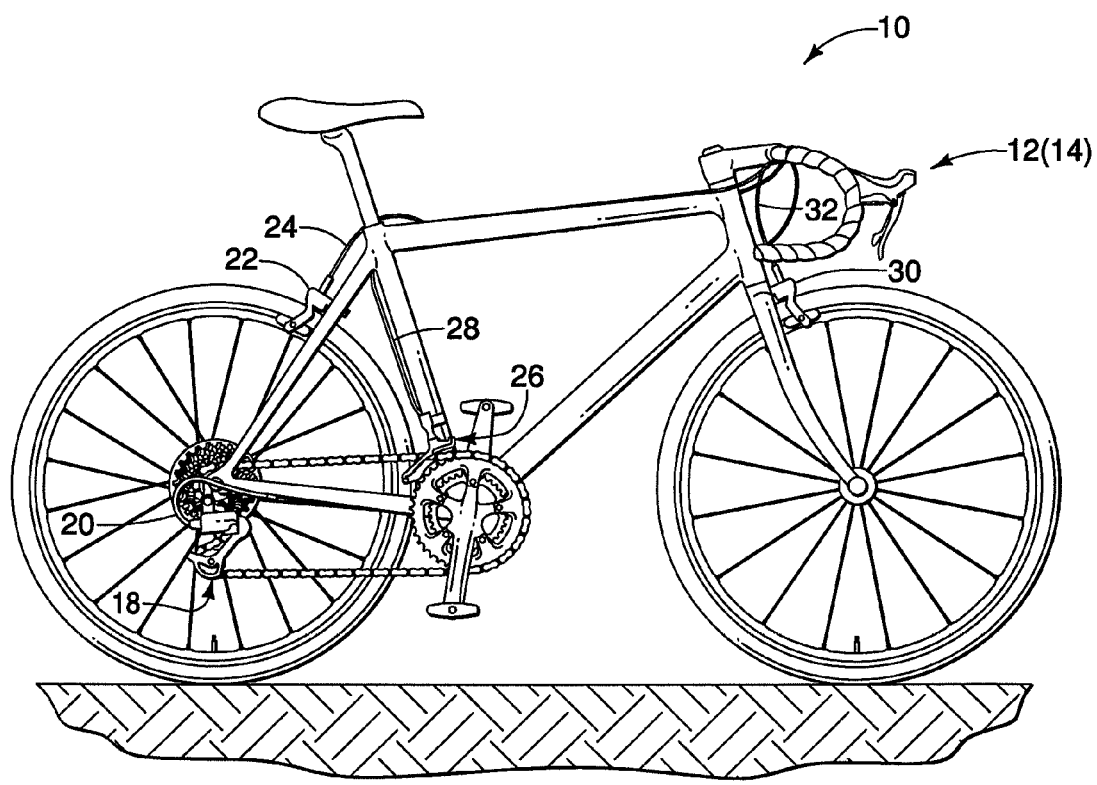
FIG. 1 is a side elevational view of a bicycle equipped with a pair of bicycle component (brake/shift) actuating devices (only one shown) coupled to a drop type handlebar in accordance with a preferred embodiment.
Figure 2:
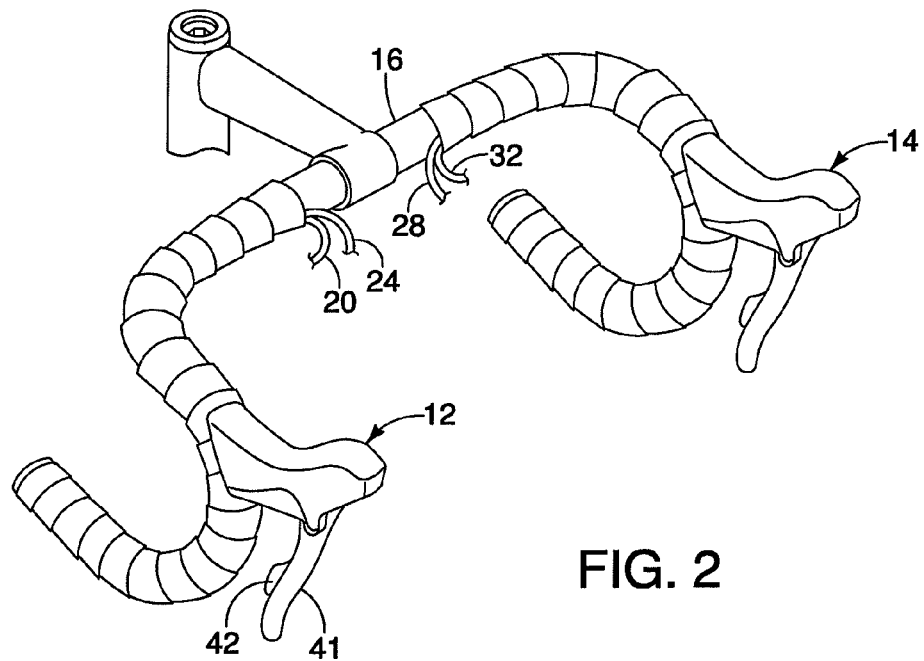
FIG. 2 is an enlarged partial perspective view of the drop type handlebar with the bicycle component (brake/shift) actuating devices in accordance with the illustrated embodiment.

Referring initially to FIGS. 1 and 2, a bicycle 10 is illustrated in accordance with a pair of shift operating devices 12 and 14 mounted on a bicycle handlebar 16 in accordance with one embodiment. The shift operating device 12 is a right hand side control device operated by the rider's right hand, while the shift operating device 14 is a left hand side control device operated by the rider's left hand. In the illustrated embodiment, the shift operating device 12 is operatively coupled to a rear derailleur 18 via a shift control cable 20 and a rear brake device 22 via a brake control cable 24. The shift operating device 14 is operatively coupled to a front derailleur 26 via a shift control cable 28 and a front brake device 30 via a brake control cable 32. Alternatively, the shift operating devices 12 and 14 can be switched so that the rider can operate the rear derailleur 18 and the front derailleur 26 with opposite hands and/or operate the rear and front brake devices 22 and 30 with opposite hands. In the illustrated embodiment, the left hand side shift operating device 14 is substantially identical to the right hand side shift operating device 12, except for the shifting unit has been modified to reduce the number of gears that can be shifted. In any event, the left hand side shift operating device 14 is essentially identical in construction and operation to the right hand side shift operating device 12, except that the left hand side shift operating device 14 is a mirror image of the right hand side shift operating device 12 and the number of shift positions for the left hand side shift operating devices 12 and 14 are different. Thus, only the right hand side shift operating device 12 will be discussed and illustrated herein. Preferably, the cables 20, 24, 28 and 32 are conventional bicycle control cables that have an outer casing that covers an inner wire.

Referring now to FIGS. 3 to 7, the shift operating device 12 includes a brake lever bracket member 36 that selectively houses a shift control unit 38 or 38A. Each of the shift control units 38 and 38A is provided with a shift unit cage or support member 39 that supports the corresponding one of the shift control units 38 and 38A. The shift control units 38 and 38A are identical except that the shift control units 38 and 38A are configured with a different number of gear or shift positions. Thus, only the parts of the shift control unit 38 will be discussed herein. Of course, it will be apparent from this disclosure the description of the parts of the shift control unit 38 applies to the parts of the shift control unit 38A. The shift control unit 38 includes a control member 40 that is operated by a first user operating lever 41 to perform a first shifting operation, and a second user operating lever 42 to perform a second shifting operation. The first user operating lever 41 also functions as a brake lever as explained below.

Figure 3:
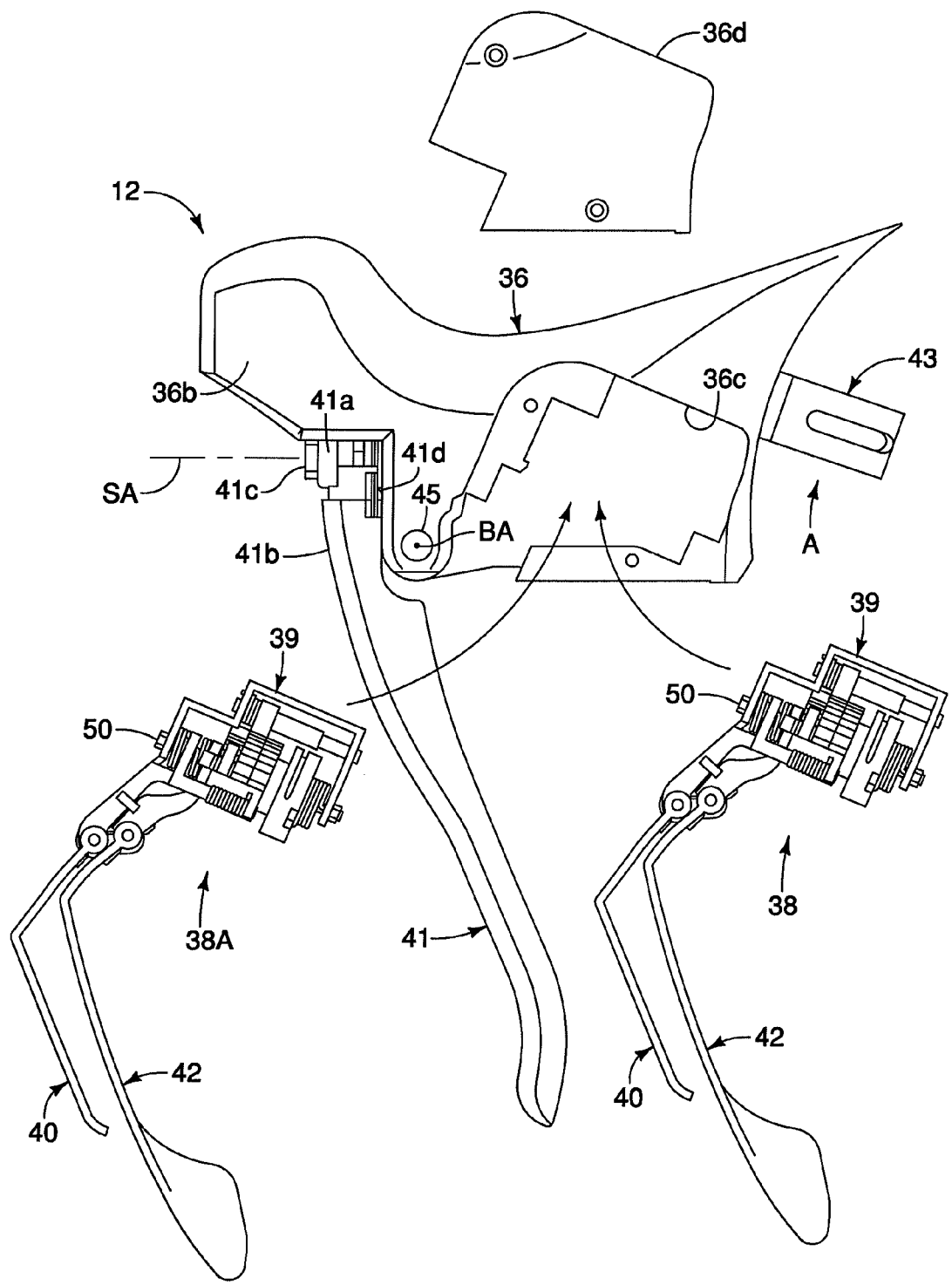
FIG. 3 is an exploded elevational view of the right bicycle component (brake/shift) actuating device showing two different shift control units that can be selectively mounted in the recess of the brake lever bracket member.

As seen in FIG. 3, in the shift operating device 12, the shift control units 38 and 38A can be interchanged, or replaced with an identical shift control unit if the existing shift control unit becomes damaged. In other words, the shift operating device 12 is configured and arranged such that the shift control unit can be easily replacement in case of a problem with the existing shift control unit, or easy replacement when rider wants to change the existing shift control unit, for example, from 9-speed system (first speed system) to 10-speed system (second speed system), or vice-a-versa. This interchangeability of the shift control units 38 and 38A is made possible by the support member 39 supporting the shift control unit 38 as a single integrated unit that is removably and reinstallably mounted to the brake lever bracket member 36. In other words, the shift control units 38 and 38A are each a functionally independent unit from the braking system of the shift operating device 12.

Figure 4:
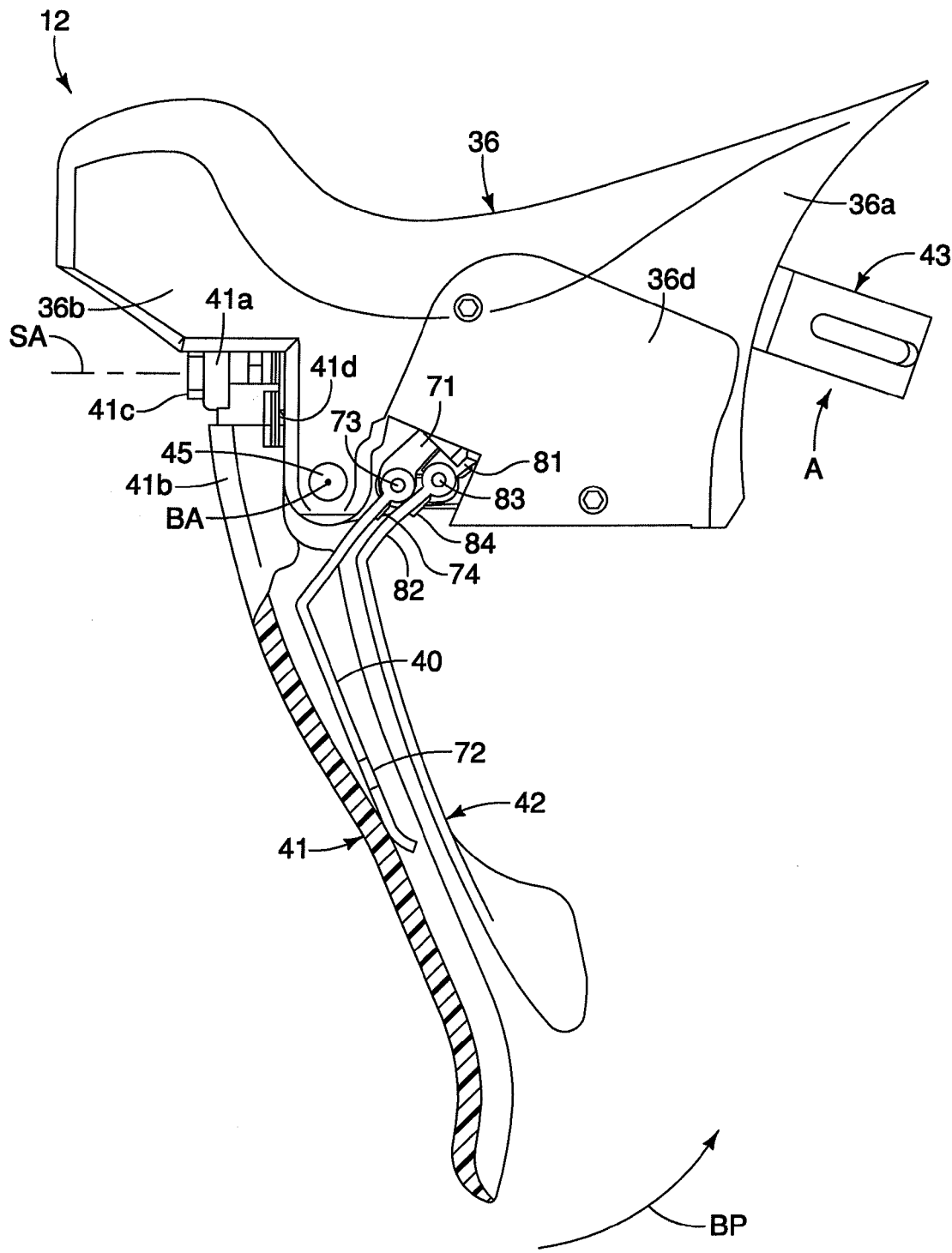
FIG. 4 is an inside elevational view of the right bicycle component (brake/shift) actuating device with the first and second operating levers in the rest positions and a portion of the first user operating lever broken away to illustrate the sliding connection between the first user operating lever and the control lever.
Figure 5:
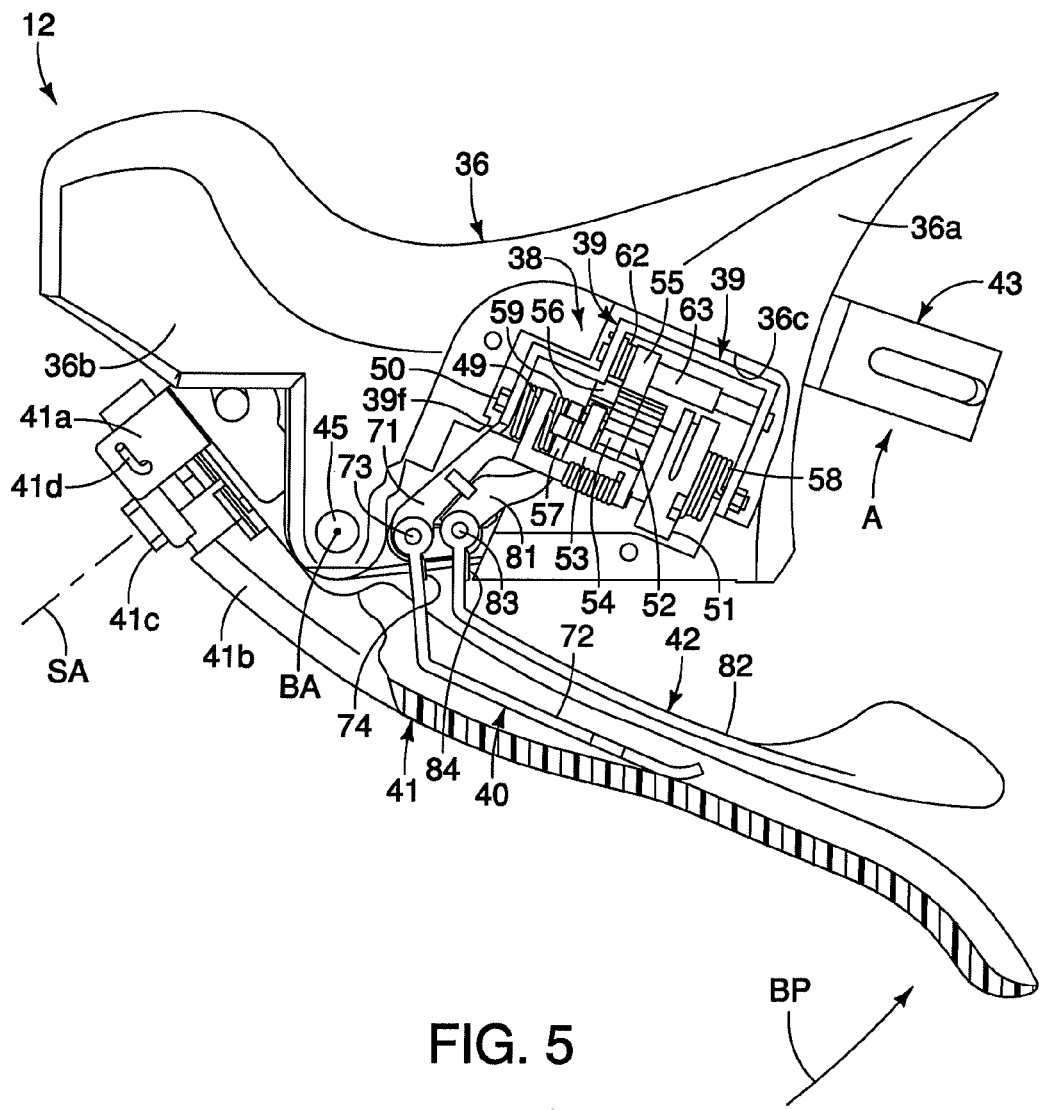
FIG. 5 is an inside elevational view of the right bicycle component (brake/shift) actuating device with the first user operating lever moved to a shifting position such that the second user operating lever moves with the first user operating lever.
Figure 6:
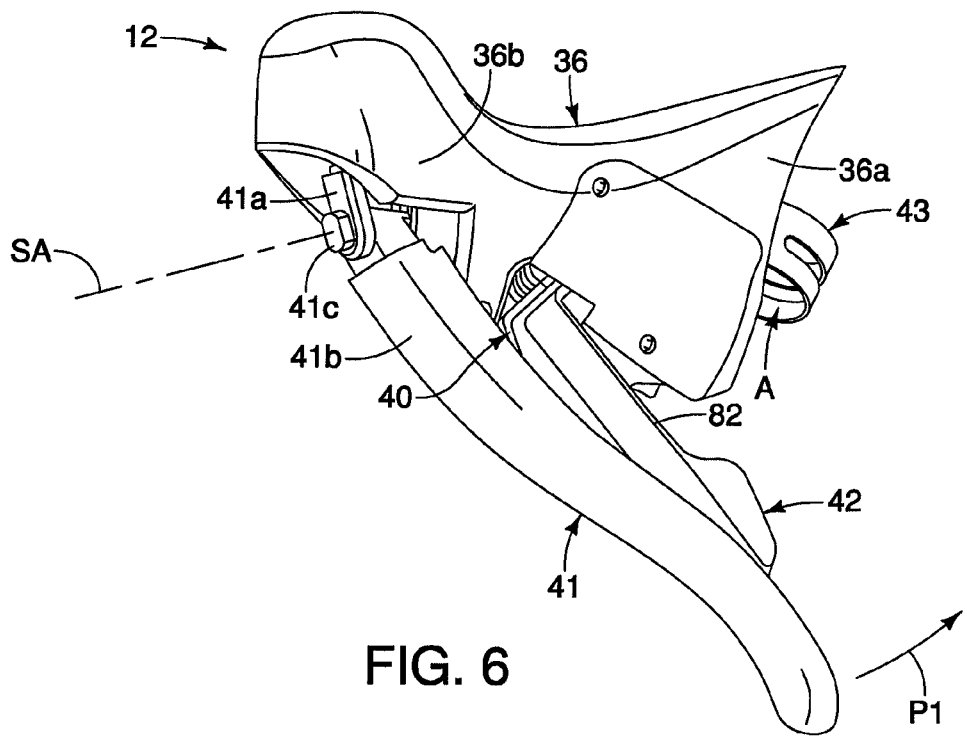
FIG. 6 is an inside perspective view of the right bicycle component (brake/shift) actuating device with the first user operating lever moved to a shifting position such that the second user operating lever moves with the first user operating lever.

As mentioned above, the first user operating lever 41 is a dual function operating lever that performs a braking operation in addition to a shifting operation. In other words, the first user operating lever 41 constitutes both a shift lever and a brake lever that is pivotally supported by the brake lever bracket member 36. Specifically, as seen in FIGS. 4 and 5, the first user operating lever 41 is moved along a movement plane or path BP to perform a braking operation in which the inner wire of the brake control cable 24 is pulled to operate the rear brake device 22. As seen in FIG. 6, the first user operating lever 41 is moved along a first shift operating plane or path P1 to perform a shift (cable pulling) operation in which the inner wire of the shift control cable 20 is pulled to operate the rear derailleur 18.

Thus, the shift operating device 12 is configured and arranged to perform both a braking operation and a shifting operation as a single integrated unit that is mounted to the handlebar 16. In the illustrated embodiment, the first user operating lever 41 is configured and arranged to perform a wire pulling operation and a braking operation, while the second user operating lever 42 is configured and arranged to perform a wire releasing operation. The second user operating lever 42 is located behind the first user operating lever 41, when the first and second user operating levers 41 and 42 are in rest positions. The first and second user operating levers 41 and 42 are aligned in the movement plane or path BP of the first user operating lever 41, when the first and second user operating levers 41 and 42 are in rest positions.

Referring now to FIG. 4, the brake lever bracket member 36 includes a main body having a first end section 36a with a handlebar mounting structure 43 and a second end section 36b remotely disposed from the first end section 36a. A shift unit receiving recess 36c is formed on the inboard facing side of the brake lever bracket member 36. The shift unit receiving recess 36c selectively receives and supports the shift control unit 38 or 38A therein. A cover 36d of the brake lever bracket member 36 overlies the opening of the shift unit receiving recess 36c to substantially conceal the shift control unit 38 or 38A within the shift unit receiving recess 36c. The cover 36d of the brake lever bracket member 36 is secured to the main body of the brake lever bracket member 36 by a pair of screws.

Figure 8:
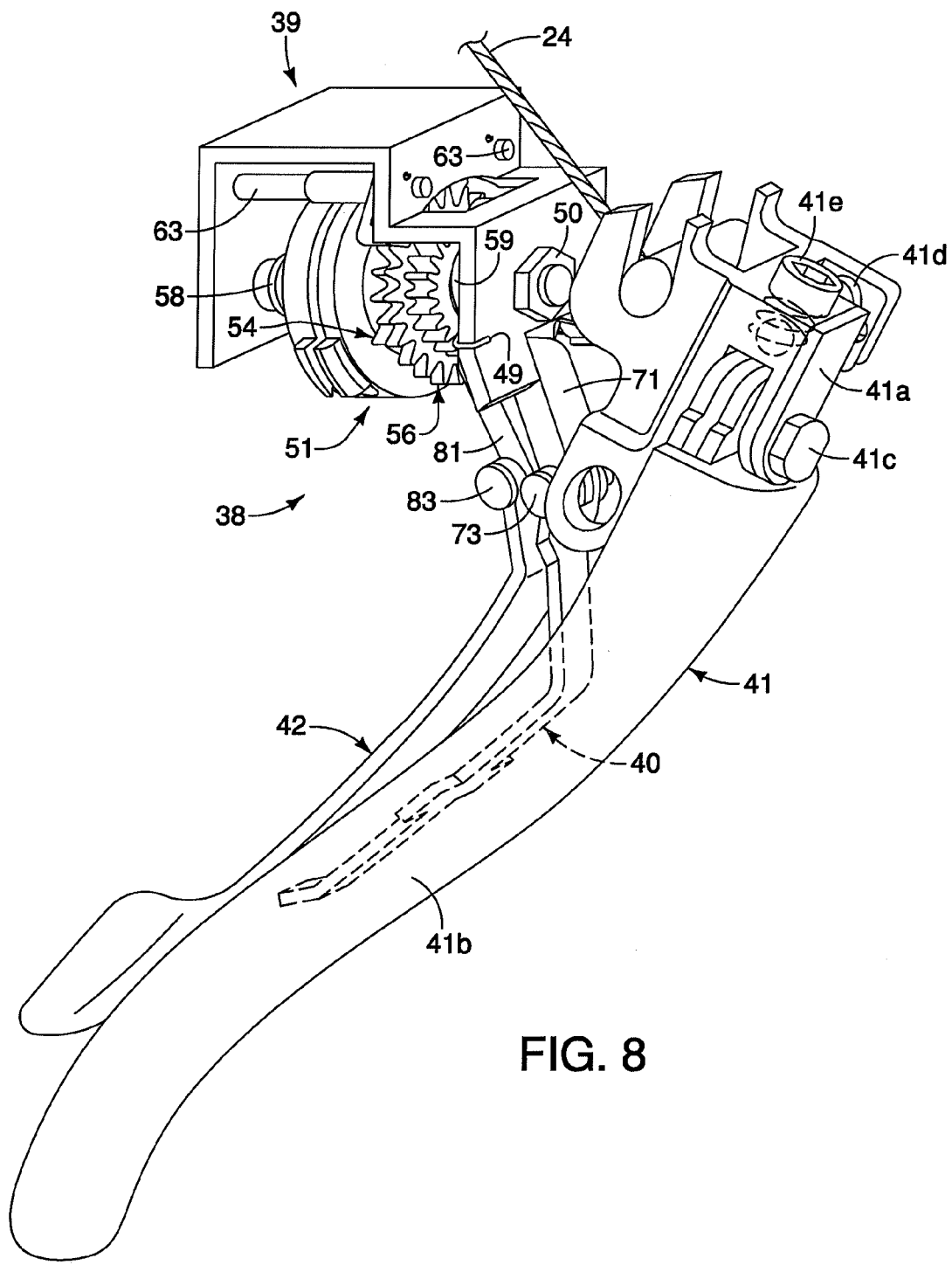
FIG. 8 is an enlarged partial perspective view of the shift control unit of the right bicycle component (brake/shift) actuating device with the first and second user operating levers in the rest positions.
Figure 9:
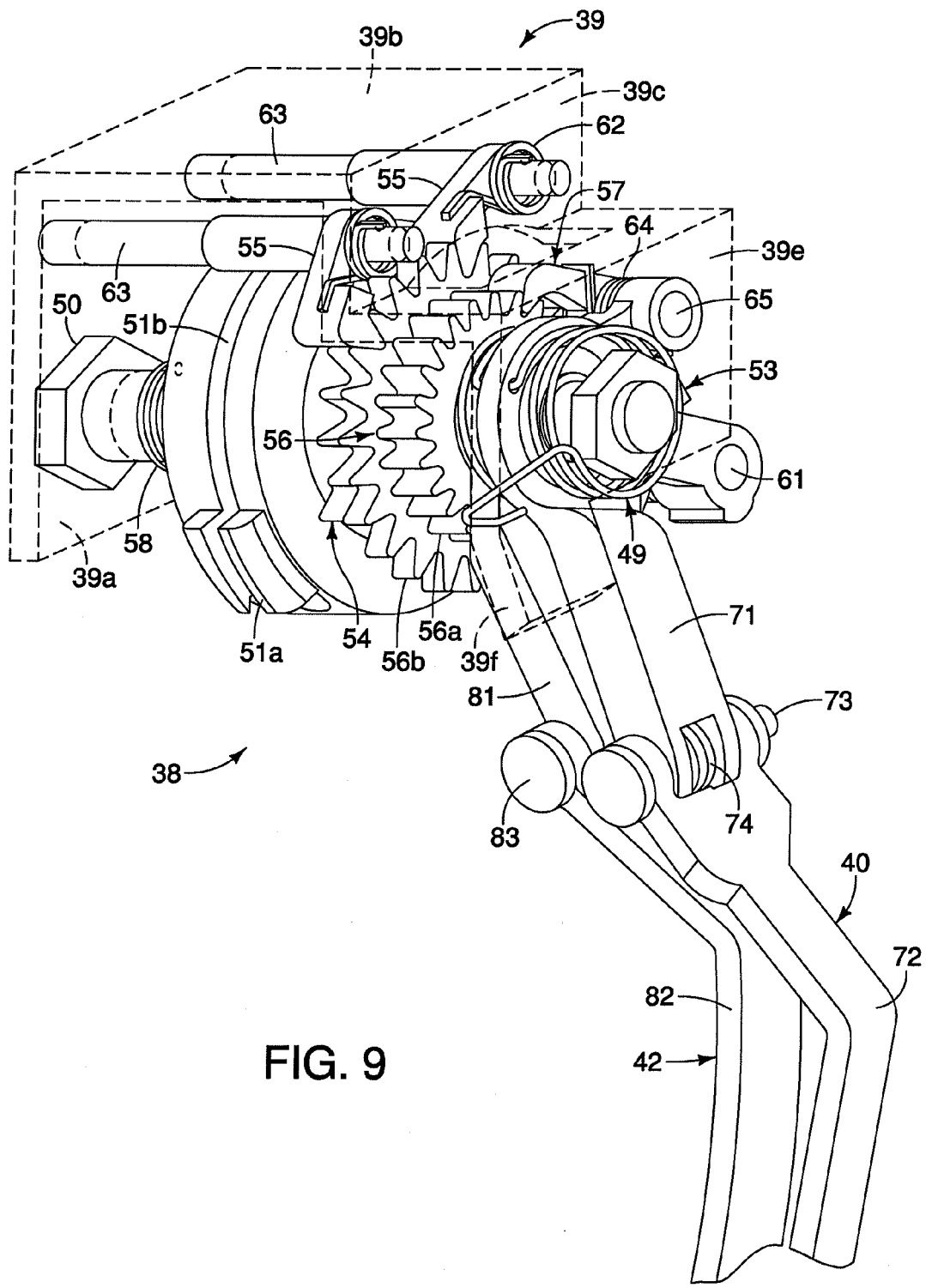
FIG. 9 is an enlarged partial perspective view of a first lateral side of the shift control unit of the right bicycle component (brake/shift) actuating device.
Figure 10:
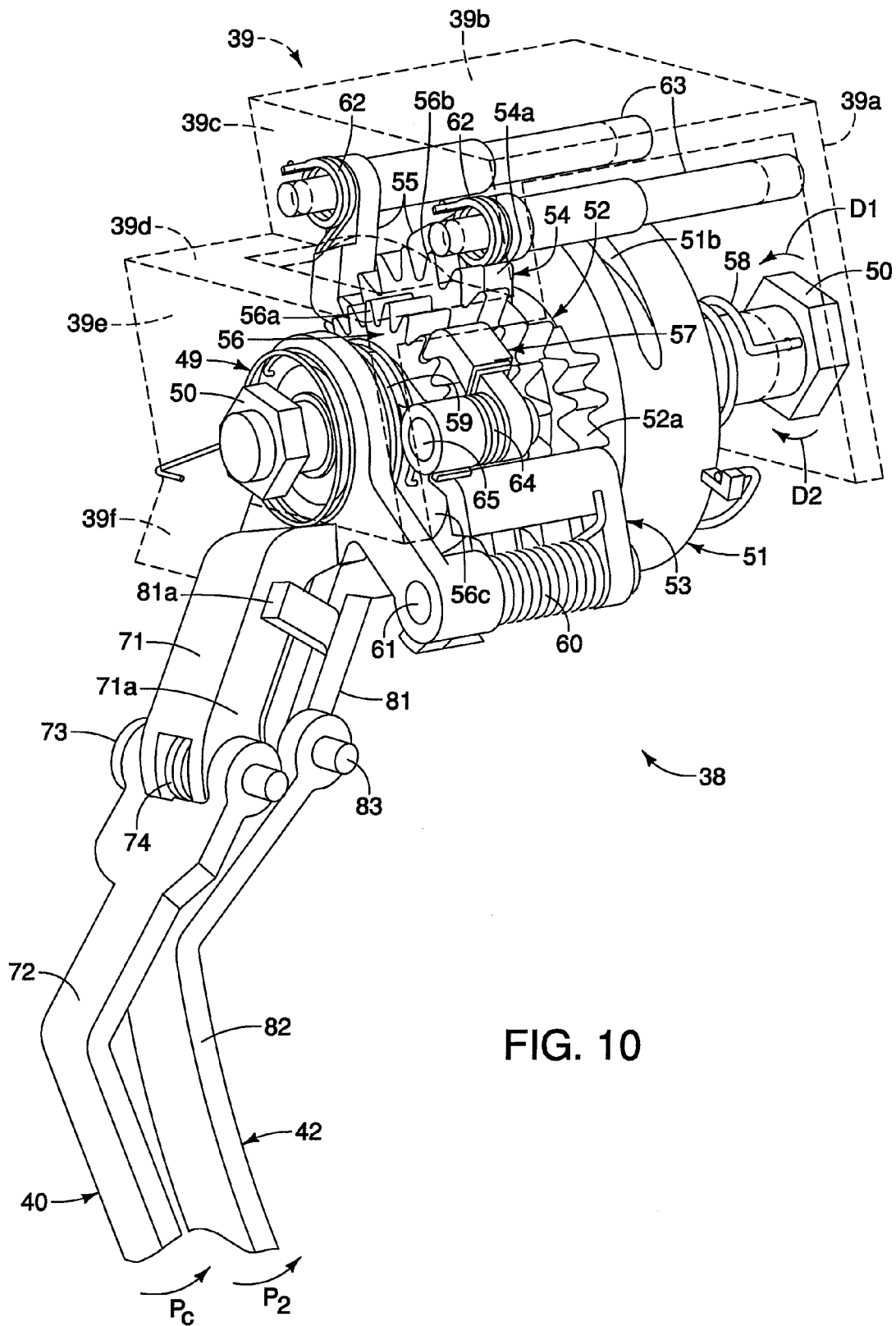
FIG. 10 is an enlarged partial perspective view of a second lateral side (i.e., the opposite side from FIG. 9) of the shift control unit of the right bicycle component (brake/shift) actuating device.

The first and second user operating levers 41 and 42 are located at the second end section 36b of the main body of the brake lever bracket member 36. As seen in FIGS. 8 to 10, a return spring 49 is preferably operatively coupled between the support member 39 and the control member 40 to urge the control member 40 to a rest position against the support member 39 as explained below. In the illustrated embodiment, the return spring 49 is a torsion spring mounted on the main axle 50 with one end fixed to the support member 39 and the other end fixed to the control member 40. This return spring 49 also holds the second user operating lever 42 in a rest position as will become apparent from the discussion below on the connection between the control member 40 and the second user operating lever 42. In any event, the first and second user operating levers 41 and 42 are normally maintained in the rest positions by the return spring 49.

The brake lever bracket member 36 is fixedly mounted to the handlebar 16 by the handlebar mounting structure 43, which defines a handlebar receiving area A with a central handlebar mounting axis. The handlebar mounting structure 43 is preferably a conventional band clamp or similar structure. Thus, the brake lever bracket member 36 is configured to be mounted to the handlebar 16 of the bicycle 10 via the handlebar mounting structure 43.

As seen in FIGS. 8 to 10, in this illustrated embodiment, the shift control unit 38 is a cable operating device. In addition to the control member 40 and the second user operating lever 42, the shift control unit 38 further includes a main axle 50, a wire takeup member 51, a winding plate or member 52, a winding or driving pawl 53, a positioning plate or member 54, a pair of positioning pawls 55, a release plate or member 56 and a release pawl 57. The wire takeup member 51, the winding plate 52, the positioning plate 54 and the release plate 56 are all rotatably mounted on the main axle 50. The wire takeup member 51, the winding plate 52 and the positioning plate 54 are fixed together as an integrated unit so as to rotate together. The release plate 56 can rotate independently of the wire takeup member 51, the winding plate 52 and the positioning plate 54. The shift control unit 38 will only be briefly discussed since other types of shift control units can be used as needed and/or desired.

A return spring or biasing element 58 is preferably operatively coupled between the wire takeup member 51 and the support member 39 to urge the wire takeup member 51, the winding plate 52 and the positioning plate 54 in the wire releasing direction about the main axle 50. In the illustrated embodiment, the return spring or biasing element 58 is a torsion spring with one end fixed to the wire takeup member 51 and the other end fixed to the support member 39.

A return spring or biasing element 59 is preferably operatively coupled between the second user operating lever 42 and the control member 40 to urge the second user operating lever 42 against the control member 40. In the illustrated embodiment, the return spring or biasing element 59 is a torsion spring mounted on the main axle 50 with one end fixed to the second user operating lever 42 and the other end fixed to the control member 40.

A biasing member 60 is preferably operatively coupled between the driving pawl 53 and the control member 40 to urge the driving pawl 53 into engagement with the winding plate or member 52. Thus, the driving pawl 53 is normally urged towards engagement with the winding plate 52 by the biasing member 60. In this illustrated embodiment, the driving pawl 53 and the biasing member 60 are mounted on a pivot pin 61 of the control member 40. The pivot pin 61 of the control member 40 is parallel to the main axle 50. Preferably, the biasing member 60 is a torsion spring.

Each of the positioning pawls 55 is normally urged towards engagement with the positioning plate 54 by a biasing member 62. In this illustrated embodiment, the positioning pawls 55 and the biasing members 62 are each mounted on a support pin 63. Preferably, biasing members 62 are torsion springs.

In this illustrated embodiment, the support member 39, the main axle 50 and the pins 63 define a support structure for supporting the shift control unit 38 within the shift unit receiving recess 36c of the brake lever bracket member 36. The support member 39 is slidably removable from the shift unit receiving recess 36c of the brake lever bracket member 36, while leaving the functionality of the braking system intact. With this support structure for the shift control unit 38 within the shift unit receiving recess 36c of the brake lever bracket member 36, the entire shift control unit 38 can be removable from the brake lever bracket member 36, while the first user operating lever 41 (the brake lever) remains attached to the brake lever bracket member 36 in a functionally operable state.

The wire takeup member 51 is movably supported by the main axle 50. The control member 40 includes the driving pawl 53 for moving the wire takeup member 51 in a wire pulling direction in response to movement of the first user operating lever 41 by a rider along the first shift operating path P1. The positioning plate 54 and the positioning pawls 55 form a positioning mechanism that selectively maintains a shift position of the wire takeup member 51 based on the operation of the first and second user operating levers 41 and 42 by a rider. In particular, the positioning plate 54 constitutes a first positioning member and the positioning pawls 55 constitute a second positioning member.

The positioning plate 54 (the first positioning member) is movably supported by the support structure and configured to integrally move with the wire takeup member 51. The positioning pawls 55 (the second positioning member) is supported by the support structure and configured to engage the positioning plate 54 (the first positioning member) such that the positioning plate 54 (the first positioning member) has a plurality of operating positions.

As seen in FIGS. 8 to 10, the support member 39 is a one-piece unitary member. The support member 39 includes a first support portion 39a, a first connecting portion 39b, a second support portion 39c, a second connecting portion 39d and a third support portion 39e. The first connecting portion 39b extends perpendicularly between the first and second support portions 39a and 39c such that the first and second support portions 39a and 39c are parallel. The second connecting portion 39e extends perpendicularly between the second and third support portions 39c and 39e such that the second and third support portions 39c and 39e are parallel. The third support portion 39e further includes a stop portion 39f that selectively contacts the control member 40 for setting the rest position of the control member 40. In particular, the return spring 49 biases the control member 40 against the stop portion 39f for setting the rest position of the control member 40.

The first and third support portions 39a and 39e support opposite ends of the main axle 50, while the first and second support portions 39a and 39c support opposite ends of the pivot pins 63 such that the positioning pawls 55 (the second positioning member) are supported by the first and second support portions 39a and 39c. The wire takeup member 51, the winding plate 52 and the positioning plate 54 are fixed together as an integrated unit so as to rotate together on the main axle 50 between the first and third support portions 39a and 39e. In other words, at least the wire takeup member 51, the winding plate 52, the positioning plate 54 (the first positioning member), the release plate 56, the control member 40, and the second user operating lever 42 are supported by the main axle 50 between the first and third support portions 39a and 39e of the support member 39.

Figure 11:
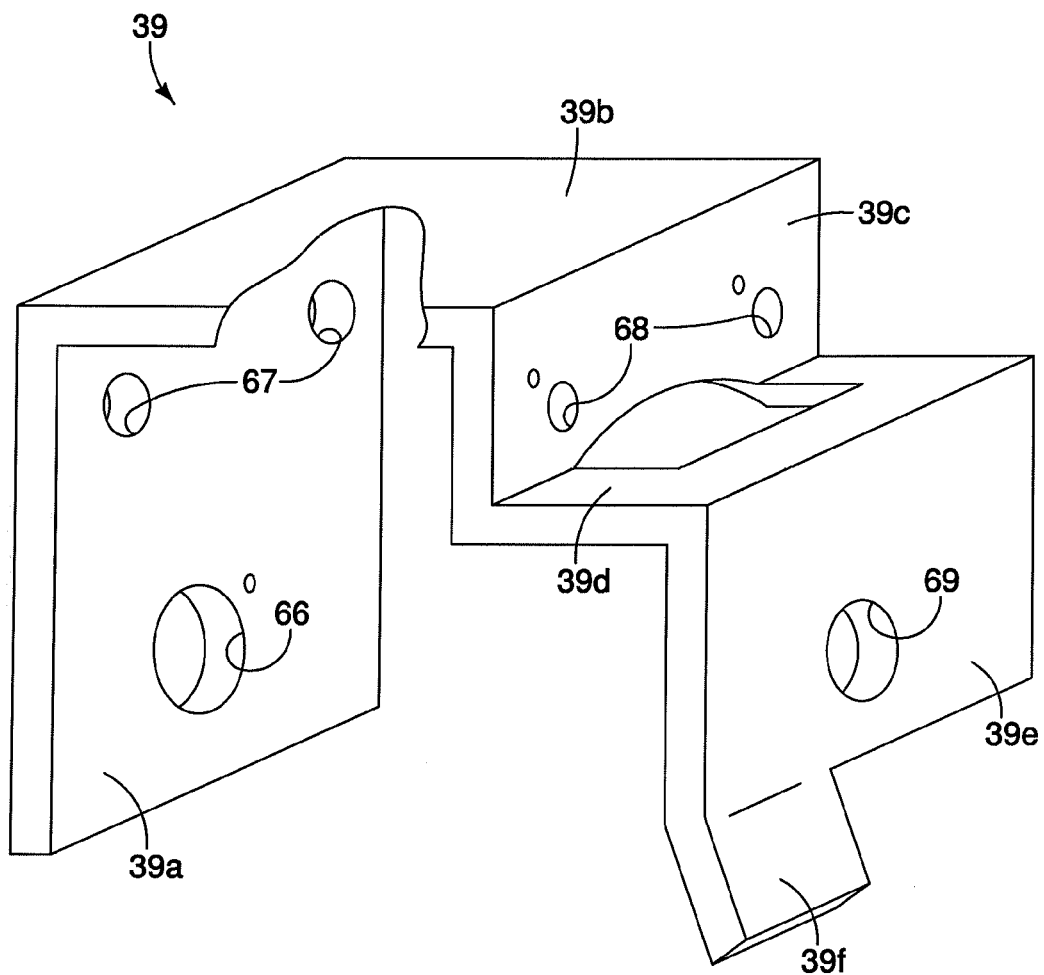
FIG. 11 is an enlarged perspective view of the support member for the shift control unit of the right bicycle component (brake/shift) actuating device.

As seen in FIG. 11, the first support portion 39a is provided with a first axle support hole 66 and a pair of first pin support holes 67. The second support portion 39c is provided with pair of second pin support holes 68. The third support portion 39e is provided with a second axle support hole 69. The first axle support hole 66 of the first support portion 39a supports one end of the main axle 50, while the second axle support hole 69 supports the other end of the main axle 50. Each of the first pin support holes 67 supports one end of one of the support pin 63, while each of the second pin support holes 68 supports the other end of the corresponding one of the support pin 63.

The wire takeup member 51 is attached to the inner wire of the shift control cable 20 to pull and release the inner wire of the shift control cable 20 in response to operation of the first and second user operating levers 41 and 42, respectively. The first user operating lever 41 is operatively coupled to the shift control unit 38 via the control member 40 to operate the shift control unit 38 (mainly, the wire takeup member 51) in a first operating (wire pulling) direction D1 (FIG. 10) about the main axle 50 of the shift control unit 38. The second user operating lever 42 is operatively coupled to the shift control unit 38 to operate the shift control unit 38 (mainly, the wire takeup member 51) in a second operating (wire releasing) direction D2 about the main axle 50 of the shift control unit 38.

Referring mainly to FIGS. 4 to 8, the first user operating lever 41 preferably includes a mounting part 41a and an operating part 41b with the operating part 41b pivotally mounted to the mounting part 41a by a pivot pin 41c. The mounting part 41a of the first user operating lever 41 is also movably coupled relative to the brake lever bracket member 36 by a pivot pin 45 about a brake lever pivot axis BA for performing the braking operation. Thus, the operating part 41b of the first user operating lever 41 is movably coupled to mounting part 41a (i.e., relative to the brake lever bracket member 36) to move along the first shift operating plane or path P1 and movably coupled relative to the brake lever bracket member 36 to move along a non-shift (brake) operating plane or path BP that is non-coincident with the first shift operating plane or path P1. The operating part 41b is biased about the pivot pin 41c to a rest position with respect to the first shift operating plane or path P1 by a biasing element 41d. A ball and recess type positioning mechanism 41e is attached to the mounting part 41a to maintain the operating part 41b of the first operating lever 41 in the rest position. The first user operating lever 41 is operatively coupled to the shift control unit 38 via the control member 40 to operate the wire takeup member 51 of the shift control unit 38 in the first operating direction D1 (see FIG. 10). The first user operating lever 41 is slidably engaged with the control member 40 such that the control member 40 is moved when the first user operating lever 41 is moved along the non-shift (brake) operating path BP with sliding contact therebetween. Thus, the control member 40 moves between the rest position and the shift position for performing a shifting operation that changes the operating position of the positioning plate 54 (the first positioning member).

Still referring mainly to FIGS. 4 to 8, the second user operating lever 42 constitutes a second control member that is rotatably supported by main axle 50 of the support structure for the shift control unit 38, and operatively coupled to the positioning mechanism (the positioning plate 54 and the positioning pawls 55). The second user operating lever 42 is operatively coupled to the shift control unit 38 to move along a second shift operating plane or path P2 to operate the wire takeup member 51 of the shift control unit 38 in the second operating direction D2 (see FIG. 10) due to operation of the second user operating lever 42. The second user operating lever 42 and the control member 40 pivot about a coincident pivot axis when performing shifting operations.

Now referring back to FIGS. 4 to 7, the movements of the first and second user operating levers 41 and 42 will now be generally discussed with respect to the brake lever bracket member 36 that is configured to be fixedly mounted to the handlebar 16 by the handlebar mounting structure 43.

As seen in FIGS. 4 to 7, in this illustrated embodiment, the first and second user operating levers 41 and 42 are configured and arranged relative to each other such that they are aligned in the non-shift (brake) operating path BP to move in the non-shift (brake) operating path BP. In particular, the second user operating lever 42 is located behind the first user operating lever 41. The control member 40 contacts the rearward facing side of the first user operating lever 41 and is located between the first and second user operating levers 41 and 42. The first user operating lever 41 is configured and arranged to pivot in a first rotational direction with respect to the brake lever bracket member 36 from the rest position of the first user operating lever 41. The second user operating lever 42 is configured and arranged to pivot in a second rotational direction with respect to the brake lever bracket member 36 from the rest position of the second user operating lever 42, with the first and second rotational directions being directions toward a central longitudinal plane of the bicycle.

As seen in FIG. 6, in this illustrated embodiment, the first and second user operating levers 41 and 42 are configured and arranged relative to each other such that the second user operating lever 42 is moved by the first user operating lever 41 when the first user operating lever 41 is operated to move the wire takeup member 51 of shift control unit 38 in the first operating direction D1 (see FIG. 10) about the main axle 50 of the shift control unit 38. In other words, when a wire pulling operation is desired, the rider pushes the first user operating lever 41 in a direction transverse to a center plane of the brake lever bracket member 36 along the first shift operating plane or path P1 from the first (rest) position (FIG. 4) to a second (shifting) position (FIG. 6) to operate the shift control unit 38. This movement of the first user operating lever 41 operates the wire takeup member 51 of shift control unit 38 via the control member 40 in the first operating direction D1 (see FIG. 10) which is a wire pilling operation in the illustrated embodiment. As mentioned above, the second user operating lever 42 moves with the first user operating lever 41 as the first user operating lever 41 is moved from the first (rest) position to the second (shifting) position to operate the shift control unit 38.

As seen in FIGS. 4 and 5, in the illustrated embodiment, the first user operating lever 41 pivots about the pivot pin 45 between a first (rest) position (FIG. 4) and a second (braking) position (FIG. 5) along the non-shift (brake) operating plane or path BP. The non-shift (brake) operating plane or path BP also constitutes a movement plane such that the first user operating lever 41 is pivotally coupled relative to the brake lever bracket member 36 about the pivot axis BA along the movement plane (BP). The movement of the first user operating lever 41 from the rest position to the braking position results in the first and second user operating levers 41 and 42 also being pivoted along the non-shift (brake) operating plane BP as seen in FIG. 5.

Figure 7:
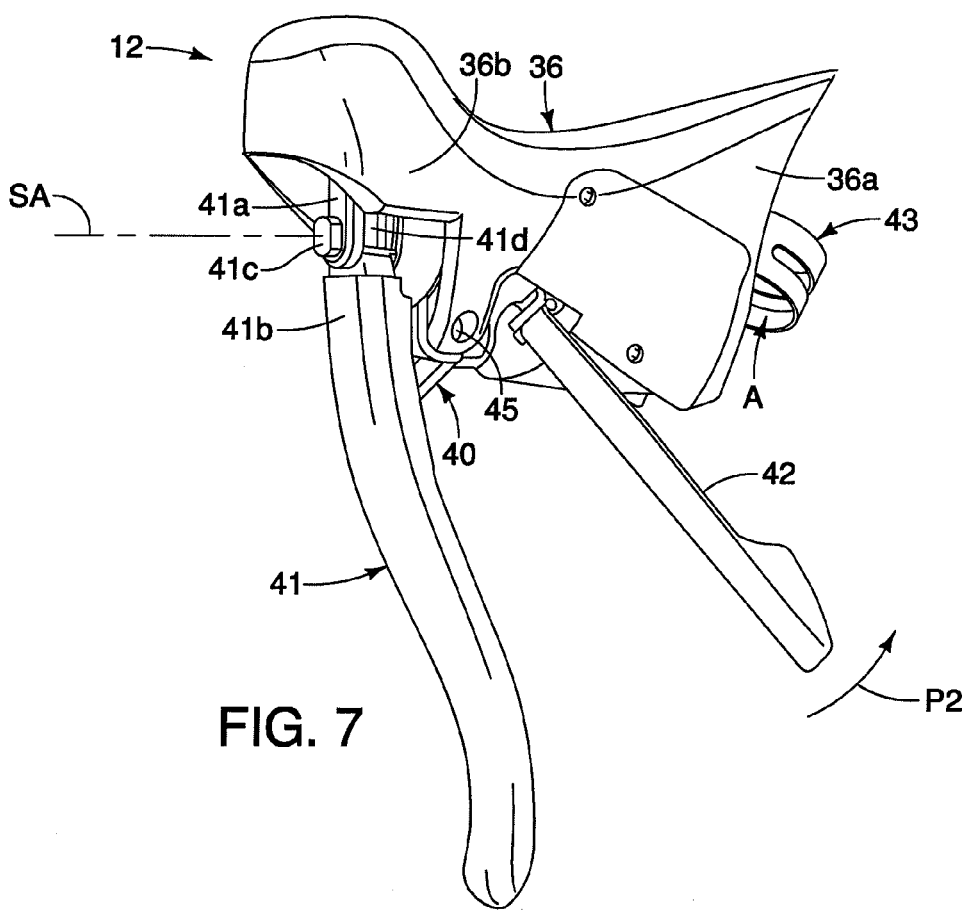
FIG. 7 is an inside perspective view of the right bicycle component (brake/shift) actuating device with the first user operating lever in the rest position and the second user operating lever moved to a shifting position.

As seen in FIG. 7, in this illustrated embodiment, the first and second user operating levers 41 and 42 are configured and arranged relative to each other such that the first user operating lever 41 remains stationary when the second user operating lever 42 is operated to move the wire takeup member 51 of shift control unit 38 in the second operating direction D2 (see FIG. 10) about the main axle 50 of the shift control unit 38. In other words, when a wire releasing operation is desired, the rider pushes the second user operating lever 42 in a direction transverse to a center plane of the brake lever bracket member 36 along the second shift operating plane or path P2 from a first (rest) position (FIG. 4) to a second (shifting) position (FIG. 7) to operate the shift control unit 38. This movement of the second user operating lever 42 operates the wire takeup member 51 of shift control unit 38 in the second operating direction D2 (see FIG. 10) which is the wire releasing operation in the illustrated embodiment. As mentioned above, the second user operating lever 42 moves independently with respect to the first user operating lever 41 as the second user operating lever 42 is moved from the first (rest) position to the second (shifting) position to operate the shift control unit 38.

Referring now to FIGS. 8 to 10, the shift control unit 38, the first user operating lever 41 and the second user operating lever 42 will now be discussed in more detail. The shift control unit 38 is mounted to the support member 39 by a main axle 50. The shift control unit 38 is basically operated by the first and second user operating levers 41 and 42 to pull or release the inner wire of the shift control cable 20. The shift control unit 38 is releasably mounted to the brake lever bracket member 36 integrally with the support member 39.

The first user operating lever 41 is configured and arranged relative to the wire takeup member 51 such that the first user operating lever 41 performs the wire pulling operation of the wire takeup member 51 when the first user operating lever 41 is operated. The second user operating lever 42 is configured and arranged relative to the wire takeup member 51 such that the second user operating lever 42 performs the wire releasing operation of the wire takeup member 51 when the second user operating lever 42 is operated.

The wire takeup member 51 is a wheel shaped member that has a peripheral edge with a cable attachment structure or point 51a and a wire receiving groove 51b as best seen in FIG. 9. Thus, the wire takeup member 51 winds and unwinds the inner wire of the control cable 20 thereon.

The winding plate 52 is fixedly coupled to the wire takeup member 51 so as to rotate together. The winding plate 52 includes a plurality of winding teeth 52a that are selectively engaged by the driving pawl 53. The driving pawl 53 is pivotally mounted to the first user operating lever 41, which in turn is pivotally mounted to the main axle 50. When the first user operating lever 41 is moved from the first (rest) position to the second (shifting) position to operate the shift control unit 38, the driving pawl 53 engages the winding teeth 52a of the winding plate 52 to rotate the wire takeup member 51 in the wire pulling direction. The driving pawl 53 is normally urged towards engagement with the winding teeth 52a of the winding plate 52 by the biasing member 60.

The positioning plate 54 cooperates with the positioning pawls 55 to maintain the wire takeup member 51 in one of a plurality of predetermined shift positions. In particular, the positioning plate 54 includes a plurality of positioning teeth 54a that are selectively engaged by the positioning pawls 55. Each of the positioning pawls 55 is normally urged towards engagement with the positioning teeth 54a of the positioning plate 54 by the biasing member 62. When the first user operating lever 41 is moved from the first (rest) position to the second (shifting) position to operate the shift control unit 38, the positioning plate 54 is rotated so that the positioning teeth 54a of the positioning plate 54 move the positioning pawls 55 momentarily out of holding engagement with the positioning teeth 54a of the positioning plate 54. Thus, the positioning teeth 54a of the positioning plate 54 are ratchet teeth that are configured and arranged to ratchet the positioning pawls 55 when the wire takeup member 51 is rotated in the wire pulling direction.

The release plate 56 cooperates with the positioning pawls 55 to release the wire takeup member 51 so that the wire takeup member 51 rotates in the wire releasing direction due to the urging force of the return spring or biasing element 58 and a cable tension due to, for example, a pull force from the rear derailleur 18. In particular, the release plate 56 includes a plurality of driving teeth 56a, a plurality of release teeth 56b and a winding pawl disengagement portion 56c. The driving teeth 56a are selectively engaged by the release pawl 57, while the release teeth 56b selectively engage the positioning pawls 55. The winding pawl disengagement portion 56c moves the driving pawl 53 out of engagement with the winding teeth 52a of the winding plate 52 so that the winding plate 52 can rotate with respect to the driving pawl 53, when the second user operating lever 42 is moved from the first (rest) position to the second (shifting) position to operate the shift control unit 38 in the wire releasing (unwinding) direction.

The release pawl 57 is normally urged towards engagement with the driving teeth 56a of the release plate 56 by a biasing member 64. In this illustrated embodiment, the biasing member 64 is a torsion spring that is mounted on a pivot pin 65 which in turn attaches the release pawl 57 to the second user operating lever 42. When the second user operating lever 42 is moved from the first (rest) position to the second (shifting) position to operate the shift control unit 38, the release plate 56 is rotated so that the release teeth 56b selectively engage the positioning pawls 55 to release the positioning plate 54. In particular, the release teeth 56b are ratchet teeth that are configured and arranged to ratchet the positioning pawls 55 when the release plate 56 is rotated in the first operating direction D1 (see FIG. 10). Thus, the release plate 56 releases the wire takeup member 51 to rotates in a wire releasing direction due to the urging force of the return spring or biasing element 58 and the cable tension in response to movement of the second user operating lever 42.

The control member 40 is pivotally mounted to the main axle 50 to move along an operating plane Pc. The operating plane Pc intersects with the non-shift (brake) operating plane or path BP (movement plane) of the first user operating lever 41 and being parallel with the second operating plane P2. The control member 40 is located behind the first user operating lever 41 and the control member 40 is located in front of the second user operating lever 42, when the first and second user operating levers 41 and 42 are in rest positions.

In particular, the control member 40 basically includes a first portion or mounting part 71 and a second portion 72. The first portion or mounting part 71 is movably supported by the support structure and at least partially (e.g., primarily in the illustrated embodiment) located inside the brake lever bracket member 36. The second portion or operating part 72 is at least partially (e.g., primarily in the illustrated embodiment) disposed outside the brake lever bracket member 36. The first portion 71 is operatively coupled to the positioning mechanism of the shift control unit 38 for changing the operating position of the positioning plate 54 (the first positioning member). In particular, the first portion 71 of the control member 40 is pivotally connected to the shift control unit 38 about the pivot axis of the main axle 50 to operate the shift control unit 38 when the first user operating lever 41 is operated along the first shift operating plane or path P1. The second portion 72 is spaced from the first portion 71 and contacts the rear surface of the first user operating lever 41. Thus, the first user operating lever 41 is slidably engaged with the second portion 72 of the control member 40 such that the second portion 72 of the control member 40 is moved when the first user operating lever 41 is moved along the non-shift operating path BP with sliding contact therebetween.

As seen in FIGS. 4 and 5, a hinge pin 73 pivotally interconnecting the first and second portions 71 and 72 together. A biasing element 74 is mounted on the hinge pin 73 to urge the second portion 72 forwardly with respect to the first portion 71 to a rest position. This intermediate hinge between the first and second portions 71 and 72 allows the second portion 72 to pivot rearwardly with respect to the first portion 71 such as when the first user operating lever 41 is operated from the rest (non-braking) position to the braking position. In other words, the control member 40 includes an intermediate hinge such that the second portion 72 of the control member 40 is pivoted in non-operating direction when the first user operating lever 41 is operated.

The first portion 71 of the control member 40 has an abutment 71a (side surface) for moving the second user operating lever 42 when the first user operating lever 41 is operated. When the wire pulling operation is desired, the rider pushes the first user operating lever 41 in a direction transverse to the non-shift (brake) operating plane or path BP (movement plane) of the first user operating lever 41 along the first shift operating plane or path P1 from the first (rest) position to a second (shifting) position. This movement of the first user operating lever 41 causes the control member 40 to move therewith to operate the shift control unit 38.

The second user operating lever 42 is pivotally mounted to the main axle 50 to move along the second shift operating plane or path P2. The second shift operating plane P2 intersects with the non-shift (brake) operating plane or path BP (movement plane) of the first user operating lever 41. The second user operating lever 42 and the control member 40 pivot about a coincident pivot axis of the main axle 50 when performing shifting operations. The second user operating lever 42 is located behind the first user operating lever 41, when the first and second user operating levers 41 and 42 are in rest positions.

In particular, the second user operating lever 42 basically includes a first portion 81 operatively coupled to the shift control unit 38 and a second portion 82 spaced from the first portion 81. A hinge pin 83 pivotally interconnecting the first and second portions 81 and 82 together. As seen in FIGS. 4 and 5, a biasing element 84 is mounted on the hinge pin 83 to urge the second portion 82 forwardly with respect to the first portion 81 to a rest position. This hinge between the first and second portions 81 and 82 allows the second portion 82 to pivot rearwardly with respect to the first portion 81 such as when the first user operating lever 41 is operated from the rest (non-braking) position to the braking position as seen in FIG. 5. In other words, the second user operating lever 42 includes a hinge such that the second portion 82 of the second user operating lever 42 is pivoted in a non-operating direction when the first user operating lever 41 is operated.

The first portion 81 of the second user operating lever 42 has an abutment 81a (flange) contacts the abutment 71a of the control member 40 such that the second user operating lever 42 moves with the first user operating lever 41 when the first user operating lever 41 is operated. Thus, the abutments 71a and 81a are configured and arranged relative to each other such that the second user operating lever 42 is moved by the first user operating lever 41. The second portion 82 of the second user operating lever 42 has a finger contact portion located at the end opposite the hinge for moving the second user operating lever 42 about the main axle 50 of the shift control unit 38. When the wire releasing operation is desired, the rider pushes the finger contact portion of the second user operating lever 42 in a direction transverse to the non-shift (brake) operating plane or path BP (movement plane) of the first user operating lever 41 along the second shift operating plane or path P2 from the first (rest) position to a second (shifting) position to operate the shift control unit 38.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the shift operating device. Accordingly, these terms, as utilized to describe the present invention should be interpreted relative to a bicycle equipped with the shift operating device as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A shift operating device comprising:
a bracket member configured to be mounted to a bicycle, the bracket member including a first end section, a second end section remotely disposed from the first end section, and a side portion extending between the first and second end sections, the side portion including upper and lower walls which oppose each other, and forward and rearward walls which oppose each other, such that the upper, lower, forward and rearward walls define a shift unit receiving recess in the side portion;
a support structure removably received in the shift unit receiving recess to mount to the bracket member such that the upper and lower walls exist above and below the support structure, and the forward and rearward walls exist forward and rearward of the support structure;
a wire takeup member movably supported by the support structure;
a positioning mechanism including a first positioning member movably supported by the support structure and configured to integrally move with the wire takeup member, and a second positioning member supported by the support structure and configured to engage the first positioning member such that the first positioning member has a plurality of operating positions; and
a control member having a first portion movably supported by and attached to the support structure at a location inside the bracket member and a second portion disposed outside the bracket member, the control member being operatively coupled to the positioning mechanism for changing the operating position of the first positioning member,
the bracket member further including a removable cover at least partially covering the shift unit receiving recess, with the support structure disposed inside the shift unit receiving recess of the bracket member and the removable cover overlying the support structure.

2. The shift operating device according to claim 1, wherein the support structure includes a support member and a main axle that are coupled together as a unit, with the wire takeup member mounted on the main axle.

3. The shift operating device according to claim 2, wherein the support member includes a first support portion coupled to the main axle and a second support portion coupled to the second positioning member.

4. The shift operating device according to claim 3, wherein the support member further includes a third support portion coupled to the main axle with the wire takeup member disposed on the main axle between the first and third support portions.

5. The shift operating device according to claim 4, wherein the wire takeup member, the first positioning member and the first portion of the control member are rotatably supported by the main axle between the first and third support portions of the support member.

6. The shift operating device according to claim 4, wherein the support member is a one-piece unitary member.

7. The shift operating device according to claim 2, wherein the control member moves between a rest position and a shift position for performing a shifting operation that changes the operating position of the first positioning member.

8. The shift operating device according to claim 7, wherein the support member includes a stop portion selectively contacting the control member for setting the rest position of the control member.

9. The shift operating device according to claim 8, wherein the control member includes a driving pawl for moving the wire takeup member in a wire pulling direction.

10. The shift operating device according to claim 1, wherein the support member is slidably removable from the bracket member.

11. The shift operating device according to claim 1, further comprising
a second control member rotatably supported by the support structure, and operatively coupled to the positioning mechanism.

12. The shift operating device according to claim 11, wherein the second control member is a separate member from the control member, with the second control member rotating independently of the control member as the second control member operates the positioning mechanism.

13. The shift operating device according to claim 11, wherein the control member is coupled to the positioning mechanism and operates the positioning mechanism as the control member is operated in a shift operating direction to perform a winding operation, and the second control member is coupled to the positioning mechanism and operates the positioning mechanism as the second control member is operated in the shift operating direction to perform a releasing operation.

14. The shift operating device according to claim 1, further comprising
a brake lever pivotally supported by the bracket member, with the support structure, the wire takeup member, the positioning mechanism, the second positioning member and the control member being removably mounted on the bracket member such that the brake lever remains attached to the bracket member in a functionally operable state with the support structure removed.

15. The shift operating device according to claim 1, further comprising
a brake lever pivotally attached to the bracket member, with the brake lever not being supported by the support structure.

16. The shift operating device according to claim 1, wherein
the support structure is configured to removably enter the shift unit receiving recess in a direction transverse to an axis about which the wire takeup member rotates.

17. The shift operating device according to claim 1, wherein
the support structure is configured to removably enter the shift unit receiving recess along a radial direction of the wire takeup member.

18. A shift operating device comprising:
a bracket member configured to be mounted to a bicycle;
a support structure removably mounted to the bracket member;
a wire takeup member movably supported by the support structure;
a positioning mechanism including a first positioning member movably supported by the support structure and configured to integrally move with the wire takeup member, and a second positioning member supported by the support structure and configured to engage the first positioning member such that the first positioning member has a plurality of operating positions;
a control member having a first portion movably supported by and attached to the support structure at a location inside the bracket member and a second portion disposed outside the bracket member, the control member being operatively coupled to the positioning mechanism for changing the operating position of the first positioning member, the first portion being pivotally connected to the second portion by a first hinge pin; and
a second control member rotatably supported by the support structure, and operatively coupled to the positioning mechanism, the second control member including first and second portions pivotally connected by a second hinge pin, with the first and second hinge pins defining offset pivot axes.

* * * * *